United States Patent [19]

Wiggins et al.

[11] Patent Number: 4,534,019

[45] Date of Patent: Aug. 6, 1985

[54] COMMON-DEPTH-POINT METHOD FOR DETERMINING AND DISPLAYING THE SHEAR-VELOCITY REFLECTIVITIES OF A GEOLOGIC FORMATION

[75] Inventors: Ralphe Wiggins; George S. Kenny; Carroll D. McClure, all of Dallas, Tex.

[73] Assignee: Mobil Oil Corporation, New York, N.Y.

[21] Appl. No.: 335,437

[22] Filed: Dec. 29, 1981

[51] Int. Cl.$^3$ .............................................. G01V 1/00
[52] U.S. Cl. ...................................... 367/75; 367/56; 364/421
[58] Field of Search .................. 367/75, 50, 56, 61, 367/47; 364/421

[56] References Cited

U.S. PATENT DOCUMENTS 3,084,332  4/1963  Amery ................................... 367/50

FOREIGN PATENT DOCUMENTS 1594633  8/1981  United Kingdom .

OTHER PUBLICATIONS

Green, C. H. "Velocity Determination by Means of Reflection Profiles", *Geophysics* 3:295 (1938).
Mayne, W. Harry, "Common Reflection Point Horizontal Data Stacking Techniques", *Geophysics* 27:6, 927-938 (1962).
Knott, C. G. "Reflection and Refraction of Seismic Waves with Seismological Applications", *Phil. Mag.* S, 5, vol. 48, No. 290, Jul. 1899, pp. 64-96.
Zoeppritz, K. "Uber Erdbebuellen VIIb", *Gottinger Nachrichten*, pp. 66-84 (1919).
Richter, C. F., "Elementary Seismology", W. H. Freidman and Company, 1968.
Spencer, T. W. "The Method of Generalized Reflection and Transmission Coefficients", *Geophysics*, vol. 25, No. 3, Jun. 1960, pp. 625-641.
Tooley et al., "Reflection and Transmission of Plane Compressional Waves", *Geophysics*, vol. 30, No. 4, Aug. 1965, pp. 552-570.
Hawes et al., "Some Effects of Spacial Filters on Signal", *Geophysics*, 39:4, pp. 464-498 (1974).
Newman, P. "Divergent Effects in a Layered Earth", *Geophysics*, vol. 38, No. 3, pp. 481-488 (1973).
T.I.L.E. Joint Venture, dated 5/17/81 and attached trade literature.

*Primary Examiner*—Nelson Moskowitz
*Assistant Examiner*—Ian Lobo
*Attorney, Agent, or Firm*—Alexander J. McKillop; Michael G. Gilman; Charles J. Speciale

[57] ABSTRACT

A novel method for determining and displaying the shear-velocity reflectivities of geologic formations is disclosed wherein a compression-wave common-depth-point seismic-data-gathering technique is utilized to produce both normal incidence compressional-velocity reflectivity sections and shear-velocity reflectivity sections for reflection points in given geologic formations. The subject method includes the gathering of common-depth-point information for a plurality of incidence angles, (theta) and estimating the linear coefficients ($R_{pp,0}$ and $R_{pp,1}$) of a linear function fitted to the amplitudes vs. $\sin^2$ (theta) measured for each point of reflection. The common-depth-point gather is conducted at angles of offset of less than 20-30 degrees such that assumptions concerning various elastic parameters: density, compressional wave velocity and shear-wave-velocity can be made which allow the application of linear fitting techniques to the gathered data. The sum of these coefficients corresponds to the shear-velocity reflectivity of the reflection point and may be presented with similar data for other points in appropriate shear-reflectivity sections.

6 Claims, 2 Drawing Figures

COMMON-DEPTH-POINT METHOD FOR DETERMINING AND DISPLAYING THE SHEAR-VELOCITY REFLECTIVITIES OF A GEOLOGIC FORMATION

BACKGROUND OF THE INVENTION

The present invention relates to methods for making common-depth-point determinations of physical characteristics of geologic formations, and more particularly to such methods wherein said physical characteristics are the shear-velocity reflectivities of geologic formations based on the reflection properties of primary (P) waves.

One technique for gathering seismic information which has experienced success in the field of oil and gas exploration is the P-wave Common-Depth-Point (CDP) technique. The CDP technique is a method for obtaining multiple coverage of each subsurface point using various surface-detector and shot-point spreads. These spreads are selected so that for each spread the reflection points are common for several shot-receiver pairs. Recordings which have common reflection points are then typically combined, or stacked, after the appropriate travel-time corrections for shot-receiver separations have been applied. These techniques enhance reflections which follow the assumed travel path. Other events are reduced. The enhanced reflections are then often plotted in a seismic section which is a mapping of the reflectivity characteristics of the subsurface lithology. Compressional wave (P-wave) information comprises the predominant portion of these plots, however shear wave information may also be included therein and may result in anomolies in the display.

The CDP technique has been developed and refined for at least the past forty years. Multiple paths centered around a common depth point were suggested at least by about 1938, (see Green, C. H. "Velocity Determination by Means of Relection Profiles", *Geophysics* 3:295 (1938). By 1956, Mayne had proposed that information associated with a given reflection point, but recorded with a multiciplity of shot-point and geophone locations, could be combined algebraically after applying appropriate time corrections. In "Common Reflection Point Horizontal Data Stacking Techniques" by W. Harry Mayne, *Geophysics* 28:6, 927–938 (1963), several CDP techniques are discussed. Mayne describes these techniques as adding a "new order of magnitude" to the usable dimensions of multi-path pattern array geometry, and as providing signal-to-noise ratios which have been enhanced well beyond the saturation point of conventional pattern methods. Mayne discloses that the horizontal spacing between source and receiver is restricted only by considerations of (1) the greatest distance which will permit coincidence adjustments of a requisite accuracy (since the probable error in postulated step-out increases with distance and must be kept small with respect to the reflection), and (2) the greatest distance over which the reflected signals persist with adequate similarity.

The theoretical premise for the CDP technique is that the seismic wvent will be consistently reflected at various incidence angles from the common point of reflection for several different shot-receiver spacings. Theoretically it is assumed that each reflection point is located at a boundary between different media. By at least as early as 1899, C. G. Knott had published work on reflection, transmission, and conversion coefficients from plane elastic waves incident on a plane boundary between homogenous isotropic media. Knott defined reflection coefficients in terms of ratios of displacement potentials. His was one of the first explicit publications of the principle that satisfying the boundary conditions at an interface required an incident P (compressional) or SV (vertically polarized shear) wave to split into four parts: reflected P and SV and transmitted P and SV waves. Knott further disclosed an explicit exptession for the energy in each wave, which, if the amplitude is known, must sum to the incident energy, (see Knott, C. G. "Reflection and Refraction of Seismic Waves with Seismological Applications", *Phil. Mag. S,* 5, Vol. 48, No. 290, July, 1899, pp. 64–96). By 1919, K. Zoeppritz had derived equations for reflection coefficients defined as ratios of displacement amplitudes. See Zoeppritz, K. "Uber Erdbebuellen VIIb", *Gottinger Nachrichten,* 1919, pp. 66–84. Unfortunately, the Zoeppritz equations are complex. In fact, these equations are so complex that various authors have commented that the equations have seldom been published without error. See Richter, C. F., "Elementary Seismology", W. H. Freidman and Company, 1968; Spencer, T. W. "The Method of Generalized Reflection and Transmission Coeffiiets", *Geophysics,* Vol. 25, No. 3, June, 1960, pp. 625–641. Perhaps one of the best papers on this topic written in recent times was authored by Tooley, R. D., Spencer, T. W., and Sagoci, H. F., entitled "Reflection and Transmission of Plane Compressional Waves", *Geophysics,* Vol. 30, No. 4, August, 1965, pp. 552–570, which is hereby incorporated by reference. Tooley et al. provide explicit expressions for the energy reflection coefficients of incident waves. Even this excellent paper, however, contains an error at equation 5 where in the calculation of P+, the term "cos" is hereby corrected to read "sin" (of alpha).

Since it has been recognized in theory that the amplitudes of shear and compressional reflectivities at a given boundary change with the angle of incidence, attention in recent years has been directed to using such changes to determine the physical characteristics at the boundary. Shear waves are produced in significant amplitudes by conversion at solid-solid boundaries at certain angles of incidence if there is a significant velocity contrast. For example, when a low-velocity layer is disposed over a higher-velocity layer, up to about 90% of the incident P-wave energy may be transmitted or reflected as P-waves for incident angles much smaller than the critical angle (e.g. less than about 25°), whaereas a much larger fraction of the incident P-wave energy may be converted to shear wave energy for greater non-critical angles of incidence (e.g. about 30°–50°).

One of the reasons for interest in shear-wave relectivities is the insensitivity of the shear-wave velocities to the fluid content of rocks. P-wave velocities may be strongly influenced by fluid content in high porosity rocks. Accordingly, if a data-gathering and display technique can be developed which will permit a convenient comparison between the P-wave and S-wave reflectivities of a given section, it may be possible to distinguish between areas which are more or less likely to contain hydrocarbon deposits.

In recent years it has been suggested that the nature of a reservoir fluid associated with a hydrocarbon deposit can be predicted seismically. Experimentally, a shale layer overlaying a gas-saturated sandstone may cause an increase in reflection amplitude with source-receiver offset, while a water-saturated sandstone would show an amplitude decrease with offset. Theoretically, tha amplitude vs. offset response for an oil-saturated sandstone would be intermediate between those for gas and water. A conventional stacked CDP seismic section contains information about the vertical and lateral changes in the acoustic impedances of the subsurface. Normally, the correlation between a vertical-incidence reflection-coefficient series convolved with a time-invarient seismic wavelet and the amplitudes of stacked seismic data is adequate for conventional hydrocarbon analysis. However, CDP gathers of seismic traces also contain information about the dependence of the reflection amplitude on the incidence angle of the wave front.

There are some inherent limitations to the detection of amplitude changes associated with oblique-angle reflections. Amplitude dependance on incidence angle exists in the seismic field system itself, in the propagation of the seismic wave, and in the geologic reflection response. In connection with prior CDP techniques, practitioners of the art have already developed a number of techniques which are intended to minimize field system and wave-front-propagation limitations. For example, it is known to compensate for differences in amplitude loss and phase distortion as the emergent angle of a wave front increases. See Hawes et al. "Some Effects of Spacial Filters on Signal", *Geophysics* 39:4, pp. 464–498, 1974. It is also known that the propagation of a seismic wave front introduces a time-variant gain into the field data due to geometrical divergence and attenuation. The amplitude-offset dependance for these effects can be related to the normal-moveout equation which defines the travel-time to a reflection as a function of offset for conventional spread lengths. The divergence correction compensates the reflection amplitude for geometrical spreading losses, so that the corrected reflection amplitudes simulate the response to a plane-wave source. (see Newman, P., "Divergent Effects in a Layered Earth", *Geophysics* Vol. 38, No. 3, pp. 481–488, 1973). Similarly, attenuation due to intrabed multiples and absorption is generally accepted to be a constant, independent of frequency in the seismic passband, such that amplitudes of reflections decrease with increasing travel-time, approximately as 1/T. In conducting most CDP analyses, a basic assumption about the CDP gather is that all traces impinge upon the same subsurface point whose reflection response may be observed at 2-way travel-times defined by a hyperbolic NMO (normal moveout) function. Normal moveout functions are generally based on reasonable velocity estimates for the given substrata. Accordingly, in CDP gathers, including those processed to determine changes of amplitude with offset, it is known to the art to use conventional demultiplexing, programmed gain control, band-pass filtering, deconvolution, wavelet compression, normal moveout corrections, trace-amplitude equalization and muting. Trace amplitude equalization, and other normalizations, are often conducted using a mean or median trace amplitude as determined from some predetermined, non-event associated time window. In determining amplitude-offset changes, it is further known to use trace muting to eliminate amplitude data collected at the critical angle, which data would otherwise unnecessarily interfere with the desired amplitude vs. offset determinations.

L. L. Liu (unpublished) has analyzed the Zoeppritz equations to determine a simple analytical estimation for the solution of the Zoeppritz-equation reflection coefficients $R_{pp}$ (theta) $R_{ps}$ (theta) when the angle of incidence is a small quantity, i.e., less than about 30°. Liu has determined that the reflection coefficient Rpp (theta) can be estimated according to the following formula for such angles of incidence:

$$R_{PP}(\theta) \simeq \tilde{R}_{PP}(\theta) = R_{PP,0} + R_{PP,1} \sin^2\theta \qquad (1)$$

where $$R_{PP,0} = \frac{1 - KY}{1 + KY} = \frac{\rho_1 V_{p1} - \rho_2 V_{p2}}{\rho_1 V_{p1} + \rho_2 V_{p2}} \qquad (2)$$

and $$R_{PP,1} = -2V^2(1 - K) \qquad (3)$$

$$\frac{Y}{1+Y}(1-Y)$$

$$-2V^2(1 + V - Z)\left[1 - \left(\frac{Z}{V}\right)^2\right]$$

where $$K = \frac{\rho_2}{\rho_1}$$

$$Y = \frac{V_{p2}}{V_{p1}}$$

$$V = \frac{V_{s1}}{V_{p1}} \text{ and}$$

$$Z = \frac{V_{s2}}{V_{p1}}.$$

Note that $R_{PP,1}$ in (3) is expanded in terms of $$\left(1 - \frac{\rho_2}{\rho_1}\right), \left(1 - \frac{V_{p2}}{V_{p1}}\right) \text{ and } \left(1 - \frac{V_{s2}^2}{V_{s1}^2}\right).$$

Similarly, the P-SV reflection coefficient is $$R_{PS}(\theta) \simeq \tilde{R}_{PS}(\theta)$$

$$= (\sin\theta)\left\{\frac{4(V - KZ)}{1 + KY} + \right.$$

$$\left. (1 - K)\left(\frac{2KZ}{V + KZ}\right) \cdot \frac{(Y - 2Z)}{(1 + KY)}\right\}$$

where the first term is proportional to $(\sigma_1 V_{s1} - \sigma_2 V_{s2})$ and the 2nd term to $(1 - \sigma_2/\sigma_1)$.

In spite of the advances discussed above, most CDP gathers continue to be plotted in sections wherein each subsurface point is assigned a single average trace amplitude. Although some plotting techniques have been used which enhance segments of those sections where amplitude-offset increases have been observed, the art has yet to develop a simple technique for gathering, determining and plotting CDP information in a manner which reflects shear-wave and P-wave reflectivities in that section.

SUMMARY OF THE INVENTION

The present invention provides a novel method for determining and displaying the compressional-and shear-velocity reflectivities of geologic formations using a P-wave CDP seismic data gathering technique. This method comprises gathering CDP P-wave reflectivity data for a plurality of angles of offset (theta) of less than about 30°; estimating the values of $\sin^2$ (theta) for each of said angles of offset; fitting a function to the amplitudes vs. $\sin^2$ (theta) measured and determined for each reflection point; determining the coefficients of said function for each reflection time and location point; and displaying said coefficients or combinations of coefficients in sections configured to generally correspond to said geologic formations, whereby such sections display the nature of the compressional-and shear-velocity reflectivities of the reflection points in said geologic formations.

The preferred method of this invention takes advantage of the fact that constants $R_{pp,0}$ and $R_{pp,1}$ are the linear coefficients for the Taylor expansion of the reflection coefficient Rpp. By limiting the angles of incidence at which data from a common-depth-point gather is utilized, by estimating the values of $\sin^2$ (theta) for each such angle in the gather, and by fitting a linear function to the measured amplitudes vs. $\sin^2$ (theta) for each reflection point, the estimated values of $R_{pp,0}$ and $R_{pp,1}$ are easily determined. By recognizing that the sum of the linear coefficients ($R_{pp,1}$ and $R_{pp,0}$) is a value representative of the shear-velocity reflectivities ($\Delta V_s/V_s$) of the reflection points, the present method provides a simple technique for determining and plotting such reflectivities. Since one of the coefficients ($R_{pp,0}$) is representative of the compressional wave reflectivity of each reflection point, a normal-incidence P-wave plot is also easily produced using the method of this invention. An important new method is thus provided for plotting sections of geologic formations to determine the possible presence of hydrocarbons therein.

In accordance with the preferred method of the present invention, estimation of the value of $\sin^2$ (theta) for any given angle theta is conducted by estimating the depth of the reflection point using the measured time for each sample and the normal moveout (NMO) velocity. Shot-receiver distances are then used to achieve a $\sin^2$ (theta) estimation for each incidence angle. Using the $\sin^2$ (theta) estimations thus determined, a linear function regression is performed, which is preferably a least-squares regression of $R_{pp,0}+R_{pp,1}\sin^2$ (theta) given the observed amplitudes. Repeating this step for each time (reflection) point of the CDP gather (and each CDP in the line), values of the normal incidence P section ($R_{pp,0}$) and of the normal incidence shear section ($R_{pp,0}+R_{pp,1}$) can then be readily displayed for all the points in the gather.

Accordingly, a primary object of the present invention is the provision of an improved seismic method of gathering, processing and displaying data representative of the compressional-and shear-velocity reflectivity of geologic formations.

A further object of the present invention is the provision of an improved method for predicting the incidence of hydrocarbon deposits in a given geologic formation utilizing the methods of this invention.

These and other objects of the present invention will become apparent from the following more detailed description.

DESCRIPTION OF THE PREFERRED EMBODIMENTS

Figure 1:
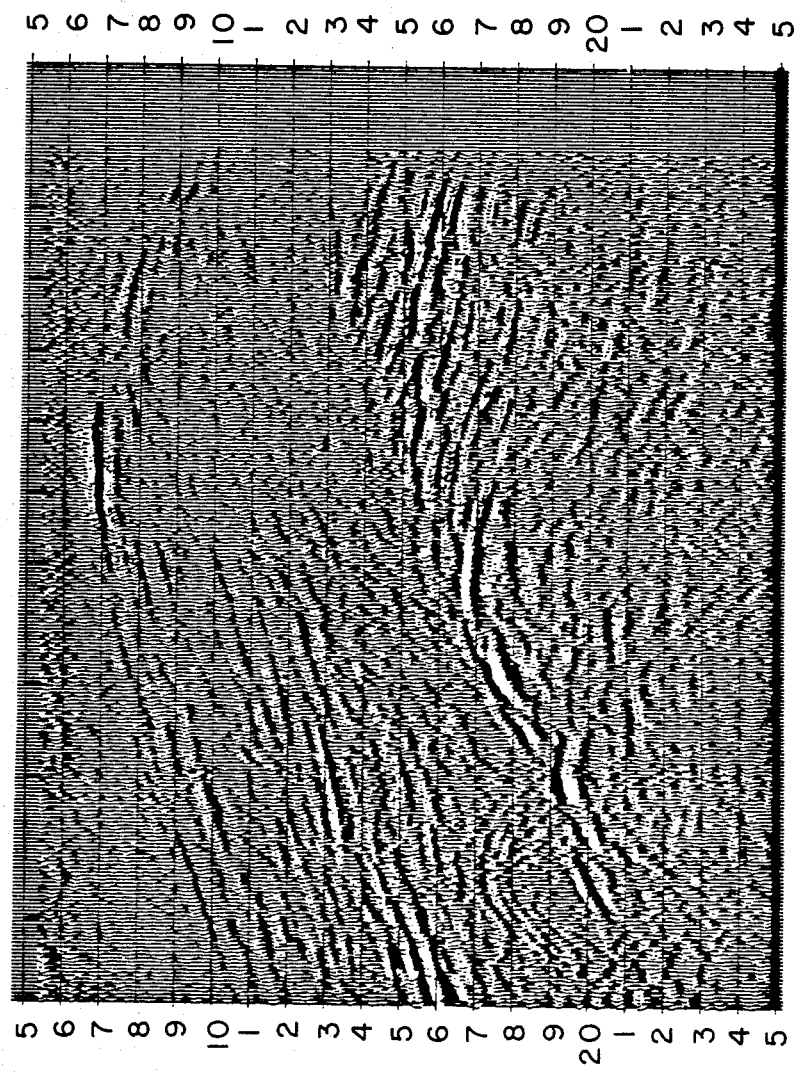
FIG. 1 is a normal incidence P-section plot of the compressional reflectivity behavior of a given geologic formation generated in accordance with the preferred method of the present invention.

While specific methods are referred to in connection with the following description, those of ordinary skill in this art will recognize that various modifications in these methods can be made without departing from the scope of the present invention, which is defined more particularly in the appended claims. In particular, those of ordinary skill in the art will recognize that various known signal conditioning muting and estimation techniques other than those described hereinafter can be utilized to practice the method of the present invention.

Standard processing of seismic data generally is conducted to normalize the amplitude of reflected arrivals so that they are assumed to be constant with offset. This assumption is the underlying justification for using stacked traces to estimate the normal incidence reflectivity in common-depth-point gathers. However, an examination of the Zoeppritz equations for the elastic reflection of plane waves shows that for near normal incidence the amplitudes behave as shown in equation 5:

$$R_{pp} = R_{pp,0} + R_{pp,1}\sin^2\theta \qquad (5)$$

Where theta is the angle between the wave normal and the interface normal, the coefficients for the normal and incidence reflection and the first order Taylor expansion are shown in equations 6 and 7:

$$R_{pp,0} = \frac{\rho_2 V_{p2} - \rho_1 V_{p1}}{\rho_2 V_{p2} + \rho_1 V_{p1}} \qquad (6)$$

$$R_{pp,1} = 2\frac{V_{s1}^2}{V_{p1}^2}\left(1 - \frac{\rho_2}{\rho_1}\right) + \frac{V_{p2}/V_{p1}}{1 + V_{p2}/V_{p1}}\left(1 - \frac{V_{p2}}{V_{p1}}\right) + 2\frac{V_{s1}^2}{V_{p1}^2}\left(1 + \frac{V_{s1}}{V_{p1}} - \frac{V_{s2}}{V_{p1}}\right)\left(1 - \frac{V_{s2}^2}{V_{s1}^2}\right) \qquad (7)$$

If the elastic parameters are rewritten as:

$$\begin{array}{ll} \rho_1 = \rho & \rho_2 = \rho + \Delta\rho \\ V_{p1} = V_p & V_{p2} = V_p + \Delta V_p \\ V_{s1} = V_2 & V_{s2} = V_s + \Delta V_s \end{array} \qquad (8)$$

and it is assumed that delta rho, delta $V_p$ and delta $V_s$ are small enough so that second order terms can be ignored and that $V_p$ is approximately equal to 2 $V_s$, then the reflection coefficient becomes:

$$R_{pp} \approx \tag{9}$$

$$\frac{1}{2}\left(\frac{\Delta\rho}{\rho} + \frac{\Delta V_p}{V_p}\right) - \frac{1}{2}\left(\frac{\Delta\rho}{\rho} + \frac{\Delta V_p}{V_p} + \frac{2\Delta V_s}{V_s}\right)\sin^2\theta$$

$$\approx R_{pp,0} + R_{pp,1}\sin^2\theta$$

Applicants have recognized that separate estimates of $R_{pp,0}$ and $R_{pp,1}$ can provide values for normal incidence compressional reflectivity $R_{pp,0}$ and shear reflectivity $\Delta V_s/V_s$, and that this latter shear reflectivity value is approximately equal to $(R_{pp,0}+R_{pp,1})$.

In accordance with the preferred method of the present invention, compressional- and shear-wave reflectivities of a geologic formation are determined and displayed using a CDP seismic data gathering technique comprising normal processing up to the point of stacking the CDP gathers. Such processing normally includes demultiplexing, programmed gain control, band-pass filtering, deconvolution, wavelet compression, normal moveout correction, trace amplitude equalization, and muting. The trace amplitude equalization is generally based on the mean or median trace amplitude as determined from a preselected time window which does not necessarily correspond to a signal arrival. Since the result may be very sensitive to muting, the method of the present invention should be used only for near vertical-incidence reflections, that is, for incidence angles less than 30°, and preferably less than 20°, to thereby avoid the necessity of including higher order terms. Similarly, when velocity increases at a boundary, there will be a critical-angle reflection that is always a high-amplitude reflection. Accordingly, muting should be used to eliminate such phenomena from the CDP gathers. Similarly, visual examination of traces suggests that far traces are often distorted by the presence of non-compressional wave primary reflections and multiple reflections and should preferably be removed by an appropriate muting.

One of ordinary skill in the art recognizes that CDP gathers are gathers of compressional seismic information concerning the reflectivities of points in a geologic formation which are disposed along a usually vertical axis which bisects the distance between shot and receiver locations. In such CDP gathers, the depth along this vertical axis is typically indicated in terms of time rather than actual physical depth below ground surface. Thus, in FIGS. 1 and 2, the vertical axis of the sections represents time, while the horizontal axis corresponds to actual physical location. In the present method, it is desired to estimate the actual physical depth of each reflection point along the above-mentioned vertical axis. One of the easiest methods for making such an estimation is to use the velocity assumption used in the normal-moveout function which when multiplied by the reference time and divided by two provides a reasonable estimation of the depth (d) of the point of reflection. Assuming the distance between shot and receiver to be X, and theta to be the angle of incidence between the receiver and the aforementioned vertical axis, an estimate of $\sin^2$ (theta) can be calculated using the formula:

$$\sin^2(\text{theta}) = X^2/(X^2 + 4d^2) \tag{10}$$

Those of ordinary skill in the art will recognize that this method for estimating the value of $\sin^2$ (theta) assumes a homogenous lithology above the point of reflection, and will recognize that other approximations can be made for propagation velocities and $\sin^2$ (theta), particularly if it is desired to utilize information concerning the geologic layers which may be disposed above the point of reflection. Having thus estimated the value of $\sin^2$ (theta) for each time sample of the normal-moveout corrected traces, it is then desired to use these values to perform a least-squares regression of $R_{pp,0} + R_{pp,1} \sin^2$ (theta) to the measured amplitudes. This regression technique may be visualized as being equivalent to plotting the measured amplitudes against $\sin^2$ (theta), and then fitting a line to the plotted points, whereupon $R_{pp,0}$ is defined by the point wherein the line intersects the amplitude axis (theta $=0$), and $R_{pp,1}$ represents the slope of the line.

By repeating this step for each time of the CDP gather and each CDP gather in the line, values for $R_{pp,0}$ and $R_{pp,1}$ will readily be obtained for each reflection point in the section. This information is then assembled for presentation into a display as a normal-incidence P-reflectivity section ($R_{pp,0}$ points) and as a shear-reflectivity section ($R_{pp,0}+R_{pp,1}$ points).

Figure 2:
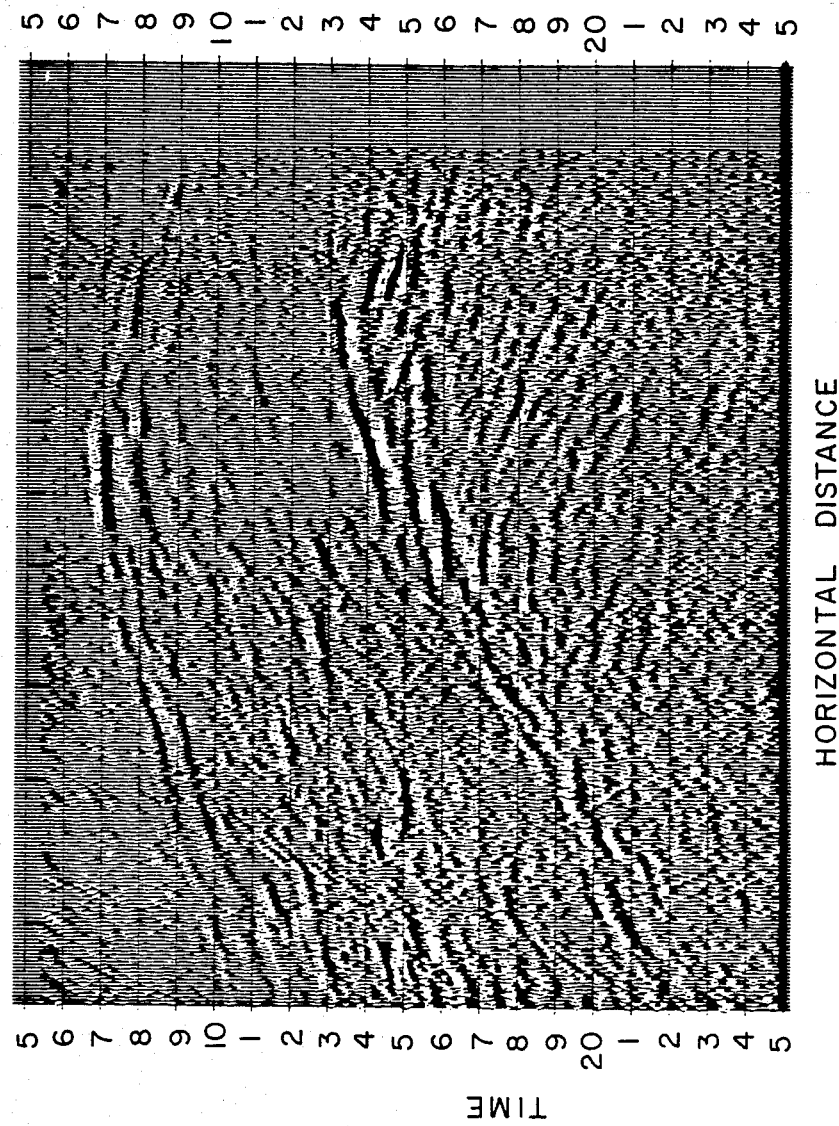
FIG. 2 is an equivalent shear section display of the geologic formation which was the subject of FIG. 1, displaying shear-velocity reflectivities of that formation.

FIG. 1 represents such a normal incidence P section which is a display of the compressional reflectivity behavior of a particular geologic formation. FIG. 2 is an equivalent display of the shear-velocity reflectivities of that geologic formation. It will be seen that substantial differences in such reflectivities are clearly present between such sections which will substantially aid an interpreter of this data in determining the likelihood that a given location in this section contains a possible hydrocarbon deposit.

While those of ordinary skill in this art will further recognize that the above-described technique is theoretically less accurate than a technique wherein the Zoeppritz formulas are used in their entireties to represent and display collected data, the large volume of data to be processed, the complexity of the Zoeppritz formulas and the difficulties otherwise encountered in applying the Zoeppritz formulas make the technique of the present invention far superior to any data gathering, interpretation, presentation and plotting method heretofore known to the art.

In view of the foregoing description, those of ordinary skill in the art will recognize that techniques other than the above-mentioned least-squares regression technique may be used to fit a linear function to the measured amplitudes. For most applications, however, the ease and simplicity of performing a least-squares regression makes this the method of choice.

What is claimed:

1. A method for determining and displaying at least shear-velocity reflectivities of geologic formations using a compressional common-depth-point seismic data gathering technique, comprising:
   (a) collecting a common-depth-point gather of amplitudes for a plurality of angles of incidence (theta) of less than 30°, said angles of incidence (theta) being the angles between the wave normals and the interface normals;
   (b) estimating the values of $\sin^2$ (theta) for each of said angles of incidence;
   (c) fitting a linear function to the amplitudes vs. $\sin^2$ (theta) for a plurality of points of reflection within said gather;

(d) determining the coefficients of said linear function;

(e) estimating at least the values of shear-velocity reflectivity of said points of reflection by summing said coefficients; and (f) displaying said values in a display configured to generally correspond to a section of said geologic formation, whereby the nature of shear-velocity reflectivity of said geologic formation is represented by said display.

2. The method of claim 1 wherein said angles of incidence are less than about 20°.

3. The method of claim 1 wherein said values of $\sin^2$ (theta) are estimated by estimating the depth (d) of each point of reflection at a given time.

4. The method of claim 3 wherein said $\sin^2$ (theta) values are estimated by using the formula $$\sin^2(\text{theta}) = X^2/(X^2 + 4d^2)$$

where X equals the distance between the shot and receiver positions at said time.

5. The method of claim 2 wherein said shear-velocity reflectivities are determined using the least squares regression of $R_{pp,0} + R_{pp,1} \sin^2$ (theta) on the measured amplitudes, and wherein each such shear-velocity reflectivity value is determined by summing $R_{pp,0}$ and $R_{pp,1}$.

6. The method of claim 1 wherein said method further comprises determining and displaying the compressional (P wave) reflectivities of said formation, said reflectivity values being represented by the intercept coefficients of said functions, whereby the values of said intercept coefficients corresponds to the values of the compressional reflectivities ($R_{pp,0}$) of said formations.

* * * * *